United States Patent
Ghabra et al.

(10) Patent No.: US 6,838,985 B2
(45) Date of Patent: Jan. 4, 2005

(54) SYSTEM AND METHOD FOR REMOTE TIRE PRESSURE MONITORING WITH LOW FREQUENCY INITIATION

(75) Inventors: Riad Ghabra, Dearborn Heights, MI (US); John S. Nantz, Brighton, MI (US); Qingfeng Tang, Novi, MI (US); Salman Khreizat, Dearborn, MI (US)

(73) Assignee: Lear Corporation, Southfield, MI (US)

( * ) Notice: Subject to any disclaimer, the term of this patent is extended or adjusted under 35 U.S.C. 154(b) by 37 days.

(21) Appl. No.: 10/323,546

(22) Filed: Dec. 18, 2002

(65) Prior Publication Data

US 2003/0179085 A1 Sep. 25, 2003

Related U.S. Application Data

(60) Provisional application No. 60/367,191, filed on Mar. 25, 2002.

(51) Int. Cl.[7] ................ B60C 23/00; B60C 23/02; G08B 13/14
(52) U.S. Cl. ............ 340/445; 340/442; 340/446; 340/447; 340/572.1; 73/146.2; 73/146.3; 73/146.4; 73/146.5
(58) Field of Search ............... 340/442, 445, 340/446, 447, 572.1, 10.1, 10.3, 572.2, 572.4; 73/146.5, 146.2, 146.3, 146.4

(56) References Cited

U.S. PATENT DOCUMENTS

| 3,580,353 A | 5/1971 | Thompson |
| 3,723,966 A | 3/1973 | Mueller et al. |

(List continued on next page.)

FOREIGN PATENT DOCUMENTS

| DE | 19924232240 | 3/1994 |
| EP | 0 016 991 A | 10/1980 |
| EP | 0 646 985 A1 | 4/1995 |
| EP | 0671289 A1 | 9/1995 |
| EP | 0 753 897 A2 | 1/1997 |
| EP | 0 760 299 A1 | 3/1997 |
| EP | 0995619 A1 | 4/2000 |
| EP | 0 995 619 A1 | 4/2000 |
| EP | 1059177 | 12/2000 |
| EP | 1 113 582 A2 | 7/2001 |
| EP | 1 172 236 | 1/2002 |
| EP | 1 211 104 A3 | 6/2002 |
| EP | 1 215 056 A2 | 6/2002 |
| EP | 1 262 339 A1 | 12/2002 |
| EP | 1 267 021 A1 | 12/2002 |
| EP | 1 215 056 A3 | 9/2003 |
| FR | 2801728 A | 11/1999 |
| GB | 1483735 | 8/1977 |
| GB | 2179480 A | 3/1987 |
| GB | 2318696 A | 4/1998 |
| GB | 2363463 A | 12/2001 |
| GB | 2381972 A | 5/2003 |
| JP | 260212 A1 | 2/1990 |

(List continued on next page.)

Primary Examiner—Jeffery Hofsass
Assistant Examiner—Lam Pham
(74) Attorney, Agent, or Firm—Bill C. Panagos

(57) ABSTRACT

A system for remote monitoring of vehicle tire pressure includes monitors mounted in the tires, each including a tire pressure sensor, a transmitter for transmitting a tire pressure signal, a battery for the transmitter, and a receiver for receiving an initiation signal. Initiators are mounted on-board the vehicle, each initiator associated with one of the tire monitors. Each initiator is for use in generating a low frequency initiation signal for receipt by a tire receiver to cause the transmitter to transmit a tire pressure signal. A vehicle mounted controller activates the initiators in order to generate the low frequency initiation signals, and processes the tire pressure signals to convey tire pressure information to a user. The controller further activates the initiators in order to generate a low frequency electromagnetic field for use in recharging the batteries in the tire monitors.

20 Claims, 2 Drawing Sheets

U.S. PATENT DOCUMENTS

| | | |
|---|---|---|
| 3,916,688 A | 11/1975 | Dendy et al. |
| 4,067,235 A | 1/1978 | Markland et al. |
| 4,101,870 A | 7/1978 | Ekman |
| 4,330,774 A | 5/1982 | Doty |
| 4,450,431 A | 5/1984 | Hochstein |
| 4,468,650 A | 8/1984 | Barbee |
| 4,570,152 A | 2/1986 | Melton et al. |
| 4,609,905 A | 9/1986 | Uzzo |
| 4,660,528 A | 4/1987 | Buck |
| 4,670,845 A | 6/1987 | Etoh |
| 4,684,853 A | 8/1987 | Coash |
| 4,717,905 A | 1/1988 | Morrison, Jr. et al. |
| 4,749,993 A | 6/1988 | Szabo et al. |
| 4,761,830 A | 8/1988 | Izumi |
| 4,951,208 A | 8/1990 | Etoh |
| 5,040,561 A | 8/1991 | Achterholt |
| 5,109,213 A | 4/1992 | Williams |
| 5,156,230 A | 10/1992 | Washburn |
| 5,165,497 A | 11/1992 | Chi |
| 5,289,160 A | 2/1994 | Fiorletta |
| 5,300,875 A * | 4/1994 | Tuttle .................. 320/138 |
| 5,444,448 A | 8/1995 | Schuermann et al. |
| 5,451,959 A | 9/1995 | Schuermann |
| 5,461,385 A | 10/1995 | Armstrong |
| 5,463,374 A | 10/1995 | Mendez et al. |
| 5,473,938 A | 12/1995 | Handfield et al. |
| 5,479,171 A | 12/1995 | Schuermann |
| 5,483,827 A | 1/1996 | Kulka et al. |
| 5,485,381 A | 1/1996 | Heintz et al. |
| 5,500,637 A | 3/1996 | Kokubu |
| 5,515,014 A | 5/1996 | Troutman |
| 5,531,109 A | 7/1996 | Tsagas |
| 5,562,787 A | 10/1996 | Koch et al. |
| 5,573,610 A | 11/1996 | Koch et al. |
| 5,573,611 A | 11/1996 | Koch et al. |
| 5,585,554 A | 12/1996 | Handfield et al. |
| 5,600,301 A | 2/1997 | Robinson, III |
| 5,602,524 A | 2/1997 | Mock et al. |
| 5,612,671 A | 3/1997 | Mendez et al. |
| 5,654,689 A | 8/1997 | Peyre et al. |
| 5,661,651 A | 8/1997 | Geschke et al. |
| 5,677,667 A | 10/1997 | Lesesky et al. |
| 5,705,746 A | 1/1998 | Trost et al. |
| 5,717,376 A | 2/1998 | Wilson |
| 5,724,028 A | 3/1998 | Prokup |
| 5,728,933 A | 3/1998 | Schultz et al. |
| 5,740,548 A | 4/1998 | Hudgens |
| 5,741,966 A | 4/1998 | Handfield et al. |
| 5,753,809 A | 5/1998 | Ogusu et al. |
| 5,760,682 A | 6/1998 | Liu et al. |
| 5,774,047 A | 6/1998 | Hensel, IV |
| 5,783,992 A | 7/1998 | Eberwine et al. |
| 5,822,683 A | 10/1998 | Paschen |
| 5,835,868 A | 11/1998 | McElroy et al. |
| 5,838,229 A | 11/1998 | Robinson, III |
| 5,844,130 A | 12/1998 | Hilgart et al. |
| 5,853,020 A | 12/1998 | Widner |
| 5,880,363 A * | 3/1999 | Meyer et al. .............. 73/146.5 |
| 5,883,305 A | 3/1999 | Jo et al. |
| 5,900,808 A | 5/1999 | Lebo |
| 5,920,234 A | 7/1999 | Hill |
| 5,926,087 A | 7/1999 | Busch et al. |
| 5,929,620 A | 7/1999 | Dobkin et al. |
| 5,939,977 A | 8/1999 | Monson |
| 5,942,971 A | 8/1999 | Fauci et al. |
| 5,959,365 A | 9/1999 | Mantini et al. |
| 5,963,128 A | 10/1999 | McClelland |
| 5,999,091 A | 12/1999 | Wortham |
| 6,002,327 A | 12/1999 | Boesch et al. |
| 6,025,777 A | 2/2000 | Fuller et al. |
| 6,034,596 A | 3/2000 | Smith et al. |
| 6,034,597 A | 3/2000 | Normann et al. |
| 6,043,738 A | 3/2000 | Stewart et al. |
| 6,043,752 A | 3/2000 | Hisada et al. |
| 6,053,038 A | 4/2000 | Schramm et al. |
| 6,060,984 A | 5/2000 | Braun et al. |
| 6,087,930 A | 7/2000 | Kulka et al. |
| 6,111,520 A | 8/2000 | Allen et al. |
| 6,112,587 A | 9/2000 | Oldenettel |
| 6,118,369 A | 9/2000 | Boesch |
| 6,127,939 A | 10/2000 | Lesesky et al. |
| 6,169,480 B1 | 1/2001 | Uhl et al. |
| 6,175,302 B1 | 1/2001 | Huang |
| 6,181,241 B1 | 1/2001 | Normann et al. |
| 6,204,758 B1 | 3/2001 | Wacker et al. |
| 6,232,875 B1 | 5/2001 | DeZorzi |
| 6,232,884 B1 | 5/2001 | Gabbard |
| 6,239,753 B1 | 5/2001 | Kado et al. |
| 6,243,007 B1 | 6/2001 | McLaughlin et al. |
| 6,246,317 B1 | 6/2001 | Pickornik et al. |
| 6,252,498 B1 | 6/2001 | Pashayan, Jr. |
| 6,255,940 B1 | 7/2001 | Phelan et al. |
| 6,259,361 B1 | 7/2001 | Robillard et al. |
| 6,259,362 B1 | 7/2001 | Lin |
| 6,275,148 B1 | 8/2001 | Takamura et al. |
| 6,278,363 B1 | 8/2001 | Bezek et al. |
| 6,292,095 B1 | 9/2001 | Fuller et al. |
| 6,304,610 B1 | 10/2001 | Monson |
| 6,329,917 B1 * | 12/2001 | Leonard .................. 340/572.8 |
| 6,340,929 B1 | 1/2002 | Katou et al. |
| 6,362,731 B1 | 3/2002 | Lill |
| 6,369,703 B1 | 4/2002 | Lill |
| 6,384,720 B1 | 5/2002 | Juzswik et al. |
| 6,408,690 B1 | 6/2002 | Young et al. |
| 6,417,766 B1 | 7/2002 | Starkey |
| 6,441,728 B1 | 8/2002 | Dixit et al. |
| 6,445,287 B1 | 9/2002 | Schofield et al. |
| 6,489,888 B1 | 12/2002 | Honeck et al. |
| 6,499,343 B1 | 12/2002 | Haas et al. |
| 6,501,372 B2 | 12/2002 | Lin |
| 6,518,877 B1 | 2/2003 | Starkey et al. |
| 6,543,279 B1 | 4/2003 | Yones et al. |
| 6,571,617 B2 | 6/2003 | Van Nickerk et al. |
| 6,581,449 B1 | 6/2003 | Brown et al. |
| 6,609,419 B1 | 8/2003 | Bankart et al. |
| 6,612,165 B2 | 9/2003 | Juzswik et al. |
| 2001/0008083 A1 | 7/2001 | Brown |
| 2003/0020605 A1 | 1/2003 | Starkey |
| 2003/0201879 A1 | 10/2003 | Munch et al. |

FOREIGN PATENT DOCUMENTS

| | | |
|---|---|---|
| JP | 8244424 A | 9/1996 |
| JP | 10-107548 A | 4/1998 |
| JP | 2001-007712 A | 1/2001 |
| WO | WO 91/08614 | 6/1991 |
| WO | WO 96/15919 A1 | 5/1996 |
| WO | WO 98/26946 | 6/1998 |
| WO | WO 99-29523 | 6/1999 |
| WO | WO 01/26069 A1 | 4/2001 |
| WO | WO 01/69803 | 9/2001 |
| WO | WO 01/76007 A1 | 10/2001 |
| WO | WO 01-81104 A1 | 11/2001 |
| WO | WO 02/057097 | 7/2002 |
| WO | WO 02/072369 A1 | 9/2002 |

* cited by examiner

SYSTEM AND METHOD FOR REMOTE TIRE PRESSURE MONITORING WITH LOW FREQUENCY INITIATION

CROSS REFERENCE TO RELATED APPLICATION

This application claims the benefit of U.S. provisional application Ser. No. 60/367,191, filed Mar. 25, 2002.

BACKGROUND OF THE INVENTION

1. Field of the Invention

The present invention relates generally to wireless vehicle tire pressure monitoring and, more particularly, to a system and method for wireless vehicle tire pressure monitoring using low frequency initiation.

2. Background

It is known in the automotive industry to provide for wireless monitoring of vehicle tire parameters, particularly tire pressure. In such tire pressure monitoring systems, tire pressure sensors and radio frequency (RF) transmitters are mounted inside each tire, typically adjacent the inflation valve stem. In each tire, the tire pressure sensed by the tire pressure sensor is transmitted by the transmitter to a receiver/controller located on-board the vehicle. The tire pressure information delivered to the receiver/controller by the RF signals from the transmitters is subsequently conveyed to a vehicle operator or occupant, typically in the form of a display.

To recognize the particular tire location (e.g., front left (FL), front right (FR), rear left (RL), rear right (RR)) associated with an RF signal received from a tire transmitter, such tire pressure monitoring systems are programmed in an initialization or sign-up operation. That is, in order to provide a vehicle operator with information specific to each vehicle tire, programming of the tire pressure monitoring system must be undertaken by a technician or vehicle owner so that each RF signal from a tire transmitter will be associated with a particular tire location.

Current tire pressure monitoring systems use a magnetic reed switch in each tire for such programming. More particularly, after the on-board vehicle/controller is placed into a program, initialization, or sign-up mode, the magnetic reed switch in each tire is activated by a technician or vehicle owner using a magnet. Such activation causes the tire transmitter in the tire to transmit a tire pressure signal to the controller on the vehicle. In that regard, each pressure sensor and/or transmitter has a unique identification code associated therewith, which identification code is transmitted with the tire pressure signal. Using such identification codes, and by following a preselected sequence for activating each magnetic reed switch, the controller associates each tire pressure signal with a particular tire location.

Such operation, however, can create problems when tires are subsequently rotated or changed from their initial locations to new locations, or a vehicle tire is replaced. Each time the vehicle tires are rotated or a tire is replaced, initialization or sign-up must be repeated to ensure that the system continues to operate properly by conveying accurate information, including tire location, to the vehicle operator. This initialization requirement makes tire rotation more complex, and increases the possibility of inaccurate operation of the system.

The tire transmitters used in such tire pressure monitoring systems are typically battery powered. As a result, a transmitter has a limited amount of functioning time before its battery must be replaced. To help conserve battery power, the transmitters typically transmit tire pressure information at short, predetermined time intervals when the vehicle is moving. In addition, once the vehicle has been stationary for a predetermined amount of time, the transmitters may transmit tire pressure information at longer predetermined time intervals.

In any event, where two or more tire transmitters associated with a vehicle transmit tire pressure signals or data simultaneously, data collision can result at the vehicle mounted receiver/controller, which can adversely affect proper operation of the tire pressure monitoring system. Such data collision can also result when multiple vehicles equipped with tire pressure monitoring systems are in proximity, and tire transmitters associated with each vehicle simultaneously transmit tire pressure signals or data which may be received at each vehicle mounted receiver/controller.

Thus, there exists a need for an improved system and method for remote tire pressure monitoring. Such a system and method would use low frequency initiators to trigger or initiate transmission of wireless tire information signals from tire mounted transmitters, thereby providing for automatic identification of tire locations, without the need for initialization or sign-up operations. Such a system and method would also use such low frequency initiators to eliminate data collision and increase tire transmitter battery life, as well as to provide for recharging of tire transmitter batteries.

DISCLOSURE OF THE INVENTION

Accordingly, the present invention provides an improved system and method for remote vehicle tire pressure monitoring.

According to the present invention, then, a system is provided for remote monitoring of tire pressure in a vehicle having a plurality of tires. The system comprises a plurality of tire monitors, each monitor for mounting in one of the plurality of tires, each monitor comprising a sensor for sensing tire pressure, a transmitter for transmitting a signal representative of the sensed tire pressure, a battery for providing power to the transmitter, and a receiver for receiving an initiation signal. The system further comprises a plurality of initiators, each initiator for mounting on-board the vehicle for association with one of the plurality of tire monitors, each initiator for use in generating a low frequency initiation signal for receipt by an associated receiver, the initiation signal causing the associated transmitter to transmit a tire pressure signal. The system still further comprises a receiver for mounting on-board the vehicle for receiving the tire pressure signals transmitted by the transmitters, and a controller for mounting on-board the vehicle. The controller is provided in communication with the plurality of initiators and the receiver, and is for activating each of the plurality of initiators in order to generate the low frequency initiation signal and for processing the tire pressure signals received by the receiver to convey tire pressure information to a user. The controller is further for activating each initiator to in order to generate a low frequency electromagnetic field for use in recharging the battery in the associated tire pressure monitor.

Also according to the present invention, a method is provided for remote monitoring of tire pressure in a vehicle having a plurality of tires. The method comprises providing a plurality of tire monitors, each monitor for mounting in one of the plurality of tires, each monitor comprising a sensor for sensing tire pressure, a transmitter for transmitting a signal representative of the sensed tire pressure, a battery for providing power to the transmitter, and a receiver for receiving an initiation signal. The method further comprises providing a plurality of initiators, each initiator for mounting on-board the vehicle for association with one of the plurality of tire monitors, each initiator for use in generating a low frequency initiation signal for receipt by an associated receiver, the initiation signal causing the associated transmitter to transmit a tire pressure signal. The method still further comprises providing a controller for mounting on-board the vehicle, the controller to be provided in communication with the plurality of initiators, the controller for activating each of the plurality of initiators to in order to generate the low frequency initiation signal and for processing the tire pressure signals to convey tire pressure information to a user, the controller further for activating each initiator in order to generate a low frequency electromagnetic field for use in recharging the battery in the associated tire pressure monitor.

Still further according to the present invention, a method is provided for remote monitoring of tire pressure in a vehicle having a plurality of tires. The method comprises generating, using an initiator mounted on the vehicle and associated with one of the plurality of tires, a low frequency initiation signal, and receiving the low frequency initiation signal at a receiver mounted in the one of the plurality of tires. The method further comprises transmitting, from a transmitter mounted in the one of the plurality of tires and powered by a battery, a signal representative of a sensed tire pressure in response to receipt by the receiver of the low frequency initiation signal. The method still further comprises processing, at a controller mounted on the vehicle the tire pressure signal, to convey tire pressure information to a user, and generating, using the initiator, a low frequency electromagnetic field for use in recharging the battery in the transmitter.

The following detailed description and accompanying drawings set forth preferred embodiments of the present invention.

DETAILED DESCRIPTION OF THE PREFERRED EMBODIMENT(S)

Figure 1:
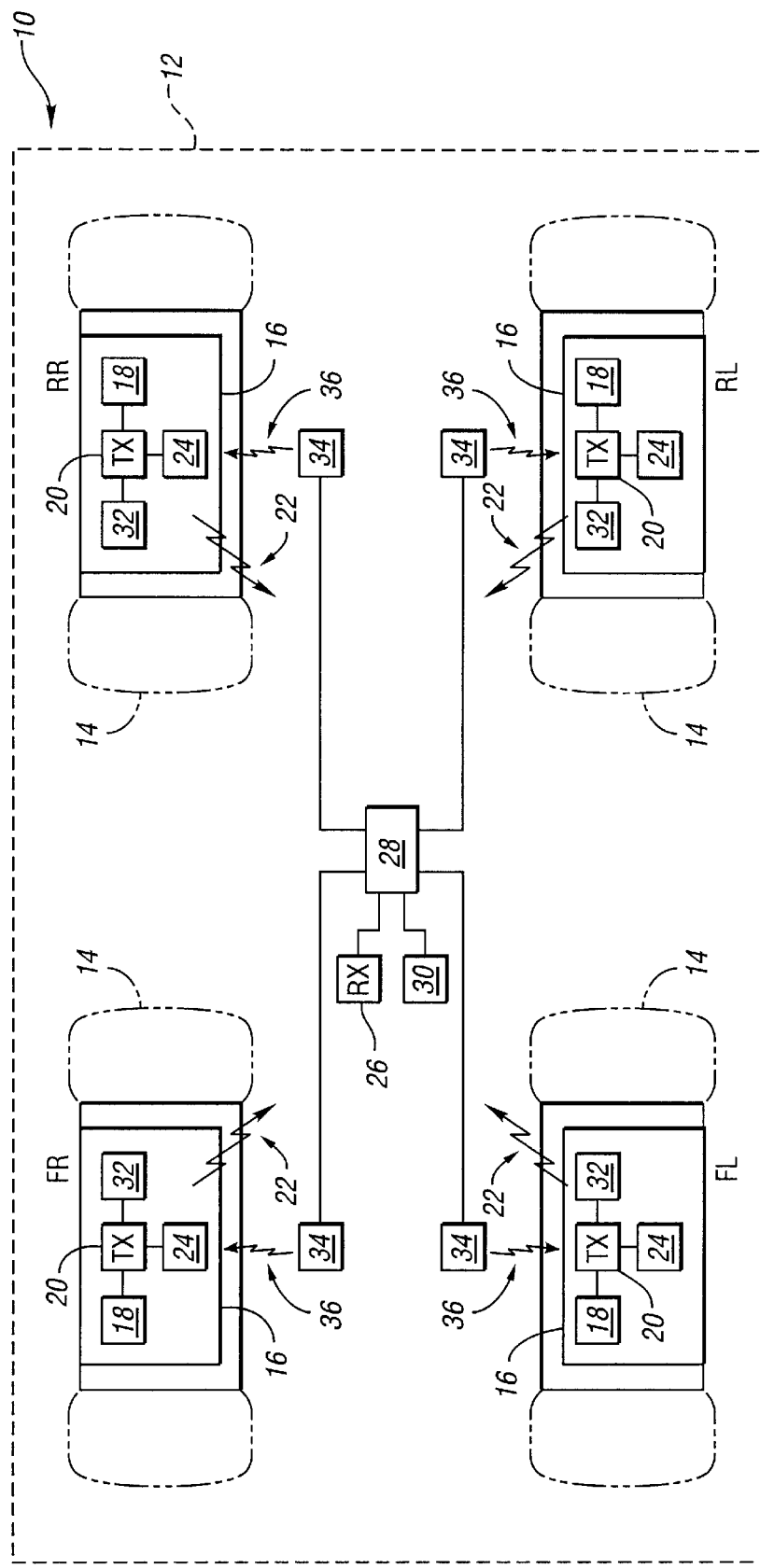
FIG. 1 is a simplified, representative block diagram of an embodiment of the system of the present invention for remote monitoring of vehicle tire pressure.

Referring now to the Figures, preferred embodiments of the present invention will now be described in detail. As previously noted, it is known in the automotive industry to provide for wireless monitoring of vehicle tire parameters, particularly tire pressure. In such tire pressure monitoring systems, tire pressure sensors and radio frequency (RF) transmitters are mounted inside each tire, typically adjacent the inflation valve stem. In each tire, the tire pressure sensed by the tire pressure sensor is transmitted by the transmitter to a receiver/controller located on-board the vehicle. The tire pressure information delivered to the receiver/controller by the RF signals from the transmitters is subsequently conveyed to a vehicle operator or occupant, typically in the form of a display.

To recognize the particular tire location (e.g., front left (FL), front right (FR), rear left (RL), rear right (RR)) associated with an RF signal received from a tire transmitter, such tire pressure monitoring systems are programmed in an initialization or sign-up operation. That is, in order to provide a vehicle operator with information specific to each vehicle tire, programming of the tire pressure monitoring system must be undertaken by a technician or vehicle owner so that each RF signal from a tire transmitter will be associated with a particular tire location.

Current tire pressure monitoring systems use a magnetic reed switch in each tire for such programming. More particularly, after the on-board vehicle/controller is placed into a program, initialization, or sign-up mode, the magnetic reed switch in each tire is activated by a technician or vehicle owner using a magnet. Such activation causes the tire transmitter in the tire to transmit a tire pressure signal to the controller on the vehicle. In that regard, each pressure sensor and/or transmitter has a unique identification code associated therewith, which identification code is transmitted with the tire pressure signal. Using such identification codes, and by following a preselected sequence for activating each magnetic reed switch, the controller associates each tire pressure signal with a particular tire location.

As noted previously, however, such operation can create problems when tires are subsequently rotated or changed from their initial locations to new locations, or a vehicle tire is replaced. Each time the vehicle tires are rotated or a tire is replaced, initialization or sign-up must be repeated to ensure that the system continues to operate properly by conveying accurate information, including tire location, to the vehicle operator. This initialization requirement makes tire rotation more complex, and increases the possibility of inaccurate operation of the system.

As also previously noted, the tire transmitters used in such tire pressure monitoring systems are typically battery powered. As a result, a transmitter has a limited amount of functioning time before its battery must be replaced. To help conserve battery power, the transmitters typically transmit tire pressure information at short, predetermined time intervals when the vehicle is moving. In addition, once the vehicle has been stationary for a predetermined amount of time, the transmitters may transmit tire pressure information at longer predetermined time intervals.

In any event, where two or more tire transmitters associated with a vehicle transmit tire pressure signals or data simultaneously, data collision can result at the vehicle mounted receiver/controller, which can adversely affect proper operation of the tire pressure monitoring system. Such data collision can also result when multiple vehicles equipped with tire pressure monitoring systems are in proximity, and tire transmitters associated with each vehicle simultaneously transmit tire pressure signals or data which may be received at each vehicle mounted receiver/controller.

Thus, as noted above, there exists a need for an improved system and method for remote vehicle tire pressure monitoring. Such a system and method would use low frequency initiators to trigger or initiate transmission of wireless tire information signals from tire mounted transmitters, thereby providing for automatic identification of tire locations, without the need for initialization or sign-up operations. Such a system and method would also use such low frequency initiators to eliminate data collision and increase tire transmitter battery life, as well as to provide for recharging of tire transmitter batteries.

Referring now to FIG. 1, a simplified, representative block diagram of an embodiment of the system of the present invention for remote vehicle tire pressure monitoring is shown, denoted generally by reference numeral 10. As seen therein, the system (10) is designed for use in a vehicle (12) having a plurality of tires (14). Each one of the plurality of tires (14) has a tire location associated therewith, such as front left (FL), front right (FR), rear left (RL), and rear right (RR). It should be noted that while the present invention is described herein for use in an automotive vehicle having four tires, such an environment is exemplary only. That is, the present invention is suitable for use in any type of vehicle having any number of tires.

Still referring to FIG. 1, the system (10) includes a plurality of tire monitors (16). Each tire monitor (16) is provided for mounting in one of the plurality of tires (14). In that regard, each tire monitor (16) is preferably located inside the tire (14) adjacent the tire inflation valve stem (not shown), although any mounting location known in the art may be used. Each tire monitor (16) includes an appropriate sensor (18) and/or other devices (not shown), for sensing, determining and/or monitoring at least the pressure of the associated tire (14). It should be noted, however, that each tire monitor (16) may also be equipped to sense, determine and/or monitor any number of tire parameters in addition to pressure including, but not limited to, temperature, status (i.e., whether or not the tire is rotating) and/or speed, in any fashion well known to those of ordinary skill in the art.

Each tire monitor (16) also includes a transmitter (20) in communication with sensor (18) for transmitting a tire pressure signal (22) representative of the sensed tire pressure. In that regard, tire pressure signal (22) is preferably a radio frequency (RF) signal, although other signal types known in the art could be employed. It should be noted that transmitter (20) may also transmit, as part of or separate from tire pressure signal (22), a signal or signals representative of information concerning any of a number of other tire parameters such as temperature, status and/or speed as sensed, measured and/or determined by an appropriately equipped tire monitor (16).

Referring still to FIG. 1, the tire pressure monitoring system (10) of the present invention also includes a receiver (26) for mounting on-board the vehicle (12) for receiving the tire pressure signals (22) transmitted by transmitters (20). Receiver (26) comprises one or more antenna (not shown) to be located at one or more selected sites on the vehicle (12). Receiver (26) is provided in communication with a controller (28) mounted on-board vehicle (12). Controller (28) is for processing tire pressure signals (22) received by receiver (26) from transmitters (20) and for generating information signals (not shown) for use in conveying at least tire pressure information to a vehicle operator, typically via a display unit (30), such as an LED display or a lighted icon in the vehicle dashboard or a vehicle console. It should be noted that receiver (26) and controller (28) may be combined in a single module. Once again, as described above, information concerning other tire parameters, such as temperature, status and/or speed may also be conveyed to the vehicle operator. It should be noted that the information may also be conveyed to the vehicle operator in an audible fashion, and may include a warning, which may also be audible, if tire pressure, other tire parameters, such as temperature, are outside recommended ranges.

Referring still to FIG. 1, each pressure sensor (18) and/or transmitter (20) preferably has a unique identification code associated therewith. Such identification codes serve to particularly associate sensors (18) and/or transmitters (20) with vehicle (12). As a result, as described in greater detail below, such identification codes can facilitate confirming or verifying tire location information. Each transmitter (20) also preferably transmits such identification code for receipt by receiver (26) and for use by controller (28) in verifying that the tire pressure signals (22) received by receiver (26) are associated with the vehicle (12). Transmitters (20) may transmit the identification codes as part of tire pressure signal (22), or as a separate signal (not shown).

Each tire monitor (16) still further includes a receiver (32), which is provided in communication with transmitter (20). Each tire monitor (16) is also associated with an initiator (34). In that regard, each initiator (34) is mounted on the vehicle, preferably proximate to one of the tire locations, such as in a vehicle wheel well (not shown). The plurality of initiators (34) are provided in communication with controller (28). As will be described in greater detail below, in response to control signals (not shown) from controller (28), each initiator (34) generates a transmitter initiation signal (36) for receipt by receiver (32). The transmitter initiation signal (36), in turn, causes the transmitter (20) to transmit a tire pressure signal (22).

According to the system (10) of the present invention, controller (28) preferably generates control signals (not shown) for activating each of the plurality initiators (34) in a preselected or predetermined manner (e.g., sequentially at or after vehicle start-up, such as when the vehicle is placed in any forward or a reverse gear). Such activation causes the initiators (34) to generate a transmitter initiation signal (36). In that regard, it should be noted that each initiator (34) is provided in communication with an antenna (not shown) for use in transmitting an initiation signal (36), and that such an antenna may be located proximate to the associated tire (14) and tire monitor (16).

In turn, an initiation signal (36), received by the associated tire receiver (32), causes the associated transmitter (20) to transmit a tire pressure signal (22). Initiation signals (36) are preferably low frequency (LF) signals in the range of approximately 125–135 kHz, but other types of signals could be used. In that regard, where LF initiation signals (36) are used, the LF antennas (not shown) provided in communication with initiators (34) may advantageously be shared between the tire pressure monitoring system and a vehicle remote keyless entry system also utilizing LF signals.

More particularly, controller (28) preferably selectively activates each initiator (34) to generate a transmitter initiation signal (36). In that regard, when seeking tire pressure information from the Front Left (FL) tire (14), controller (28) activates the initiator (34) associated with the FL tire location. As a result, in the manner described above, vehicle-mounted receiver (26) receives a tire pressure signal (22) from transmitter (20) in tire monitor (16) associated with tire (14) having the FL location. A similar process is performed for each tire location (e.g., front right (FR), rear right (RR), and rear left (RL)). In such a fashion, controller (28) is automatically programmed and learns tire location information, even after rotation of tires (14) to new locations. Such tire location information can be conveyed by controller (28) to a vehicle occupant via display (30) along with tire pressure information, as well as information concerning other tire parameters, such as temperature, status and/or speed. Once again, any such information may also be conveyed to the vehicle operator in an audible fashion, and may include a warning, which may also be audible, if tire pressure, other tire parameters, such as temperature, are outside recommended ranges.

Controller (28), which preferably takes the form of an appropriately programmed microprocessor or DSP, can be programmed to perform such polling in any fashion. That is, such polling could be undertaken continuously or periodically while the vehicle is in motion, such as may be indicated by a minimum vehicle speed or by equipping tire monitors (16) with rotation sensors (not shown) to detect rotation of tires (14). Such polling could alternatively be undertaken once at every ignition cycle, such as at or immediately after vehicle start-up, and/or when the vehicle (12) is placed in any forward gear or a reverse gear. In any event, such polling by controller (28) also eliminates collision between the tire pressure signals (22) and the data contained therein (22) transmitted from transmitters (20), thereby facilitating receipt of each tire pressure signal (22) by receiver (26). Such polling also helps to eliminate data collision between tire pressure signals from multiple vehicles in proximity to one another, each equipped with tire pressure monitoring systems.

As previously described, each pressure sensor (18) and/or transmitter (20) has a unique identification code associated therewith, which identification code may be transmitted with the tire pressure signal (22). As a result, after selectively activating transmitters (20) in the fashion described above, controller (28) can associate each unique identification code with a particular tire location (e.g., front left (FL), front right (FR), rear left (RL), rear right (RR). Thereafter, controller (28) can verify a tire location associated with any tire pressure signal (22) received by confirming that the tire pressure signal (22) received has the identification code expected. Such verification could be done at any time, such as at vehicle start-up, when the vehicle is placed in a forward or a reverse gear, or periodically when the vehicle (12) is in motion, such as again may be indicated by a minimum vehicle speed or by equipping tire monitors (16) with rotation sensors (not shown) to detect rotation of tires (14).

It should be noted that transmitters (20) are preferably configured to transmit tire pressure signals (22) only in response to activation by initiators (34). Alternatively, transmitters (20) may transmit tire pressure signals (22) independently, according to any desired schedule. In that regard, initiation signals (36) from initiators (34) may included instructions for use in controlling transmission of tire pressure signals (22) by the associated transmitter (20). For example, instructions in initiation signals (36) may control transmitters (20) to transmit tire pressure signals (22) according to a predetermined time period or schedule, thereby helping conserving power of batteries (24). Instructions in initiation signals (36) may also control transmitters (20) to transmit tire pressure signals (22) based on vehicle speed, such as more often at higher vehicle speeds, based on road condition, such as more often for uneven or bumpy roads as may be determined by impact sensors (not shown) in tire monitors (16), or based on other vehicle parameter. Regardless, in the fashion described above, controller (24) can correctly identify a tire location associated with any tire pressure signal (20) received even where transmitters (18) transmit tire pressure signals (20) independently (i.e., without the need for activation by initiators (34)).

Referring still to FIG. 1, each tire monitor (16) also includes a battery (24) in communication with and for providing power to an associated transmitter (20.) Transmitter (20) may also transmit, again as part of or separate from tire pressure signal (22), a signal or signals representative of the status of such a battery (24), including a low battery power status, for receipt by receiver (26). In that regard, such a low battery power status signal may be transmitted by transmitter (20) when the power of the associated battery (24) falls below a predetermined threshold value. In response to the receipt by receiver (26) of such a low battery power status signal, controller (28) preferably activates the associated initiator (34) to generate a low frequency electromagnetic field (not shown). Such an electromagnetic field is for use in recharging the battery (24) in the associated tire pressure monitor (16). In such a fashion, the present invention eliminates or substantially reduces the need to replace batteries (24) in tire pressure monitors (16).

Figure 2:
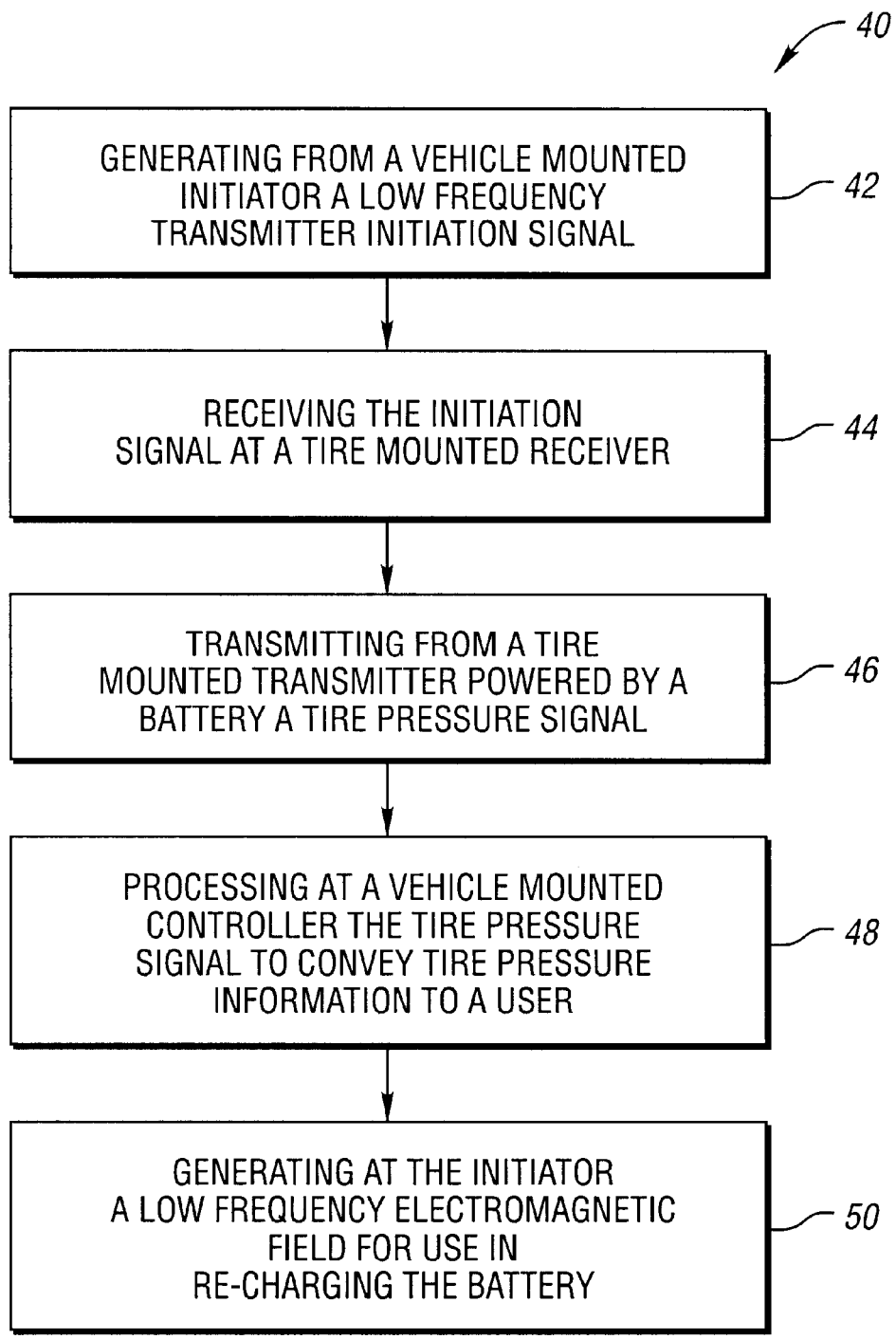
FIG. 2 is a simplified, representative flowchart of an embodiment of the method of the present invention for remote monitoring of vehicle tire pressure.

Referring next to FIG. 2, a simplified, representative flowchart of an embodiment of the method of the present invention for remote monitoring of vehicle tire pressure is shown, denoted generally by reference numeral 40. The method (40) is for use in a system for remote monitoring of tire pressure in a vehicle having a plurality of tires. As seen in FIG. 2, the method (40) comprises generating (42) from an initiator mounted on the vehicle in proximity to one of the plurality of tires a low frequency initiation signal, and receiving (44) the low frequency initiation signal at a receiver mounted in the one of the plurality of tires. The method (40) also comprises transmitting (46) from a transmitter mounted in the one of the plurality of tires and powered by a battery a signal representative of a sensed tire pressure in response to receipt by the receiver of the low frequency initiation signal. The method (40) further comprises processing (48) at a controller mounted in the vehicle the tire pressure signal to convey tire pressure information to a user, and generating (50) at the initiator a low frequency electromagnetic field for use in recharging the battery in the transmitter.

As described in greater detail above, the transmitter preferably transmits a tire pressure signal only in response to an initiation signal. The initiation signal may also include instructions for use in controlling transmission of tire pressure signals by the transmitter in any fashion, such as those described above. As also previously described, activation by the controller of the plurality of initiators in a predetermined fashion according to the method (40) of the present invention eliminates data collision, and automatically associates each tire pressure signal with one of the tire locations.

It should be noted that the simplified flowchart depicted in FIG. 2 is exemplary of the method (40) of the present invention. In that regard, the method (40) may be executed in sequences other than those shown in FIG. 2, including the execution of a subset of the steps shown and/or the execution of one or more steps simultaneously.

From the foregoing description, it can be seen that the present invention provides an improved system and method for remote vehicle tire pressure monitoring. The system and method of the present invention use low frequency initiators to trigger or initiate transmission of wireless tire information signals from tire mounted transmitters, thereby providing for automatic identification of tire locations, without the need for initialization or sign-up operations. The system and method of the present invention also use such low frequency initiators to eliminate data collision and increase tire transmitter battery life, as well as to provide for recharging of tire transmitter batteries.

While various embodiments of the invention have been illustrated and described, it is not intended that these embodiments illustrate and describe all possible forms of the present invention. Rather, the words used in the specification are words of description rather than limitation, and it is understood that various changes may be made without departing from the spirit and scope of the invention. Indeed, many alternatives, modifications, and variations will be apparent to those skilled in the art in light of the foregoing description, and the present invention is intended to embrace all such alternatives.

What is claimed is:

1. A system for remote monitoring of tire pressure in a vehicle having a plurality of tires, the system comprising:
    a plurality of tire monitors, each monitor for mounting in one of the plurality of tires, each monitor comprising a sensor for sensing tire pressure, a transmitter for transmitting a signal representative of the sensed tire pressure, a battery for providing power to the transmitter, and a receiver for receiving an initiation signal;
    a plurality of initiators, each initiator for mounting on-board the vehicle for association with one of the plurality of tire monitors, each initiator for use in generating a low frequency initiation signal for receipt by an associated receiver, the initiation signal causing the associated transmitter to transmit a tire pressure signal;
    a vehicle receiver for mounting on-board the vehicle for receiving the tire pressure signals transmitted by the transmitters; and
    a controller for mounting on-board the vehicle, the controller to be provided in communication with the plurality of initiators and the receiver, the controller for activating each of the plurality of initiators in order to generate the low frequency initiation signal and for processing the tire pressure signals received by the vehicle receiver to convey tire pressure information to a user, the controller further for activating each initiator in order to generate a low frequency electromagnetic field for use in recharging the battery in the associated tire pressure monitor;
    wherein each transmitter transmits a low battery power status signal for receipt by the vehicle mounted receiver when the power of the associated battery falls below a predetermined threshold, and the controller activates the associated initiator to generate the low frequency electromagnetic field to recharge the associated battery in response to receipt of the low battery power status signal.

2. The system of claim 1 wherein each transmitter transmits a tire pressure signal only in response to an initiation signal.

3. The system of claim 2 wherein the controller activates the plurality of initiators in a predetermined fashion to eliminate data collision.

4. The system of claim 1 wherein each initiation signal comprises instructions for use in controlling transmission of tire pressure signals by the associated transmitter.

5. The system of claim 4 wherein, to conserve battery power, the initiation signal instructions control tire pressure signal transmission according to a predetermined time period based on at least one vehicle parameter.

6. The system of claim 1 wherein each of the plurality of tires has a location associated therewith, and the controller activates the plurality of initiators so that each tire pressure signal is automatically associated with one of the tire locations.

7. The system of claim 6 further comprising a display for mounting in the vehicle, the display for use by the controller to covey tire pressure and location information to a user.

8. A method for remote monitoring of tire pressure in a vehicle having a plurality of tires, the method comprising:
    providing a plurality of tire monitors, each monitor for mounting in one of the plurality of tires, each monitor comprising a sensor for sensing tire pressure, a transmitter for transmitting a signal representative of the sensed tire pressure, a battery for providing power to the transmitter, and a receiver for receiving an initiation signal;
    providing a plurality of initiators, each initiator for mounting on-board the vehicle for association with one of the plurality of tire monitors, each initiator for use in generating a low frequency initiation signal for receipt by an associated receiver, the initiation signal causing the associated transmitter to transmit a tire pressure signal; and
    providing a controller for mounting on-board the vehicle, the controller to be provided in communication with the plurality of initiators, the controller for activating each of the plurality of initiators in order to generate the low frequency initiation signal and for processing the tire pressure signals to convey tire pressure information to a user, the controller further for activating each initiator in order to generate a low frequency electromagnetic field for use in recharging the battery in the associated tire pressure monitors;
    wherein each transmitter transmits a low battery power status signal when the power of the associated battery falls below a predetermined threshold, and the controller activates the associated initiator to generate the low frequency electromagnetic field to recharge the associated battery in response to the low battery power status signal.

9. The method of claim 8 wherein each transmitter transmits a tire pressure signal only in response to an initiation signal.

10. The method of clam 9 wherein each initiation signal comprises instructions for use in controlling transmission of tire pressure signals by the associated transmitter, the instructions controlling tire pressure signal transmission according to a predetermined time period based on at least one vehicle parameter.

11. The method of claim 9 wherein the controller activates the plurality of initiators in a predetermined fashion to eliminate data collision.

12. The method of claim 8 further comprising providing a receiver for mounting on-board the vehicle and to be provided in communication with the controller, the receiver for receiving the tire pressure signals transmitted by the transmitters.

13. The method of claim 8 wherein each of the plurality of tires has a location associated therewith, and the controller activates the plurality of initiators so that each tire pressure signal is automatically associated with one of the tire locations.

14. A method for remote monitoring of tire pressure in a vehicle having a plurality of tires, the method comprising:
    generating, using an initiator mounted on the vehicle and associated with one of the plurality of tires, a low frequency initiation signal;
    receiving the low frequency initiation signal at a receiver mounted in the one of the plurality of tires;
    transmitting, from a transmitter mounted in the one of the plurality of tires and powered by a battery, a signal representative of a sensed tire pressure in response to receipt by the receiver of the low frequency initiation signal;
    processing, at a controller mounted on the vehicle, the tire pressure signal to convey tire pressure information to a user; and generating, using the initiator, a low frequency electromagnetic field for use in recharging the battery in the transmitter;

wherein the initiation signal comprises instructions for use in controlling transmission of tire pressure signals by the transmitter, the instructions controlling tire pressure signal transmission according to a predetermined time period based on at least one vehicle parameter.

15. The method of claim 14 wherein the transmitter transmits a tire pressure signal only in response to an initiation signal.

16. The method of claim 14 wherein the controller activates the plurality of initiators in a predetermined fashion to eliminate data collision.

17. The method of claim 14 wherein each of the plurality of tires has a location associated therewith, and the controller activates the plurality of initiators so that each tire pressure signal is automatically associated with one of the tire locations.

18. A system for remote monitoring of tire pressure in a vehicle having a plurality of tires, the system comprising:

a plurality of tire monitors, each monitor for mounting in one of the plurality of tires, each monitor comprising a sensor for sensing tire pressure, a transmitter for transmitting a signal representative of the sensed tire pressure, a battery for providing power to the transmitter, and a receiver for receiving an initiation signal;

a plurality of initiators, each initiator for mounting on-board the vehicle for association with one of the plurality of tire monitors, each initiator for use in generating a low frequency initiation signal for receipt by an associated receiver, the initiation signal causing the associated transmitter to transmit a tire pressure signal, the initiation signal comprising instructions for use in controlling transmission of tire pressure signals by the associated transmitter according to a predetermined time period based on at least one vehicle parameter;

a vehicle receiver for mounting on-board the vehicle for receiving the tire pressure signals transmitted by the transmitters; and a controller for mounting on-board the vehicle, the controller to be provided in communication with the plurality of initiators and the receiver, the controller for activating each of the plurality of initiators in order to generate the low frequency initiation signal and for processing the tire pressure signals received by the vehicle receiver to convey tire pressure information to a user, the controller further for activating each initiator in order to generate a low frequency electromagnetic field for use in recharging the battery in the associated tire pressure monitor.

19. A method for remote monitoring of tire pressure in a vehicle having a plurality of tires, the method comprising:

providing a plurality of tire monitors, each monitor for mounting in one of the plurality of tires, each monitor comprising a sensor for sensing tire pressure, a transmitter for transmitting a signal representative of the sensed tire pressure, a battery for providing power to the transmitter, and a receiver for receiving an initiation signal;

providing a plurality of initiators, each initiator for mounting on-board the vehicle for association with one of the plurality of tire monitors, each initiator for use in generating a low frequency initiation signal for receipt by an associated receiver, the initiation signal causing the associated transmitter to transmit a tire pressure signal, wherein the initiation signal comprises instructions for use in controlling transmission of tire pressure signals by the associated transmitter according to a predetermined time period based on at least one vehicle parameter; and providing a controller for mounting on-board the vehicle, the controller to be provided in communication with the plurality of initiators, the controller for activating each of the plurality of initiators in order to generate the low frequency initiation signal and for processing the tire pressure signals to convey tire pressure information to a user, the controller further for activating each initiator in order to generate a low frequency electromagnetic field for use in recharging the battery in the associated tire pressure monitor.

20. A system for remote monitoring of tire pressure in a vehicle having a plurality of tires, the system comprising:

a tire monitor for mounting in one of the plurality of tires, the monitor comprising a transmitter for transmitting a signal representative of a sensed tire pressure, and a receiver; and an initiator for mounting on-board the vehicle and to be associated with the one of the plurality of tires, wherein the initiator is for use in generating a low frequency initiation signal for receipt by the receiver, the initiation signal for use in causing the transmitter to transmit a tire pressure signal and including instructions for use in controlling transmission of the tire pressure signal according to a predetermined time period based on at least one vehicle parameter.

* * * * *